United States Patent [19]  [11] 4,172,779
Yamaguchi et al.  [45] Oct. 30, 1979

[54] ELECTRODIALYSIS USING MULTI-STAGE ELECTRODIALYTIC CELL

[75] Inventors: Akira Yamaguchi, Tokyo; Katsuhiko Miyaso, Yokohama; Masami Kamaya, Kawasaki, all of Japan

[73] Assignee: Asahi Kasei Kogyo Kabushiki Kaisha, Osaka, Japan

[21] Appl. No.: 819,545

[22] Filed: Jul. 27, 1977

[30] Foreign Application Priority Data

Jul. 30, 1976 [JP] Japan ................................ 51-91018

[51] Int. Cl.$^2$ ........................................... B01D 13/02
[52] U.S. Cl. .................................. 204/180 P; 204/301
[58] Field of Search ........................... 204/180 P, 301

[56] References Cited

U.S. PATENT DOCUMENTS

| 2,860,095 | 11/1958 | Katz et al. | 204/180 P |
| 3,149,062 | 9/1964 | Gottschal | 204/301 |
| 3,271,292 | 9/1966 | Kollsman | 204/301 X |
| 3,291,716 | 12/1966 | Cioffi | 204/301 |

Primary Examiner—Arthur C. Prescott
Attorney, Agent, or Firm—Cooper, Dunham, Clark, Griffin & Moran

[57] ABSTRACT

Desalted water can be produced in an amount of 100 m$^3$/day from sea water or brackish water by passing dilution streams by means of one pump unit in series through multi-stage electrodialytic cell having gaskets of a specific structure.

4 Claims, 6 Drawing Figures

ELECTRODIALYSIS USING MULTI-STAGE ELECTRODIALYTIC CELL

This invention relates to a multi-stage electrodialysis process which comprises passing saline water to be desalted, i.e. dilution streams through a multi-stage electrodialysis apparatus in series using one pump unit. More particularly, this invention relates to a multi-stage electrodialysis process wherein the improvement comprises using gaskets of a specific structure in electrodialysis apparatus thereby to enable passing dilution streams through a multi-stage electrodialysis apparatus in series on an industrial scale by means of only one pump unit.

Figure 1:
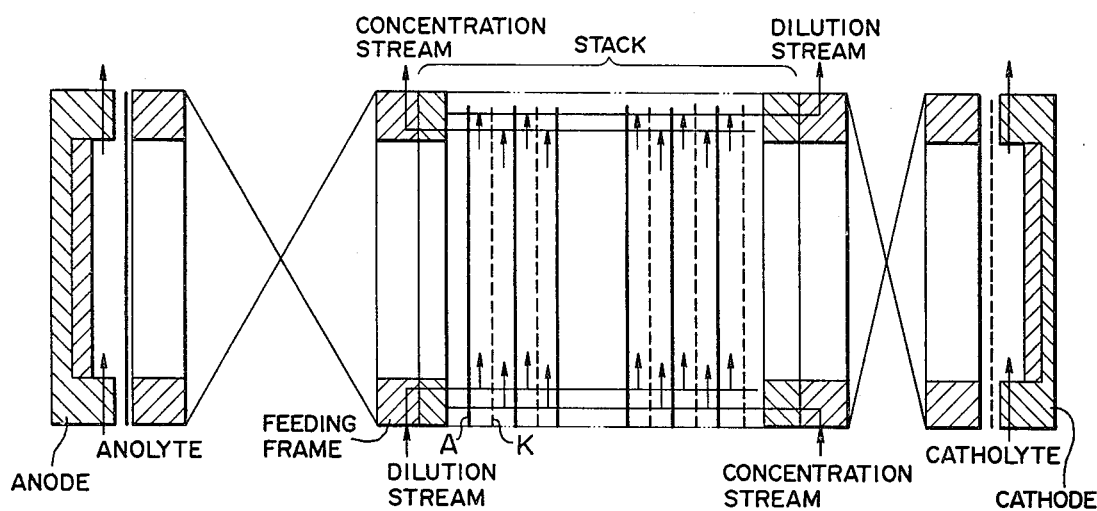
Figure 2:
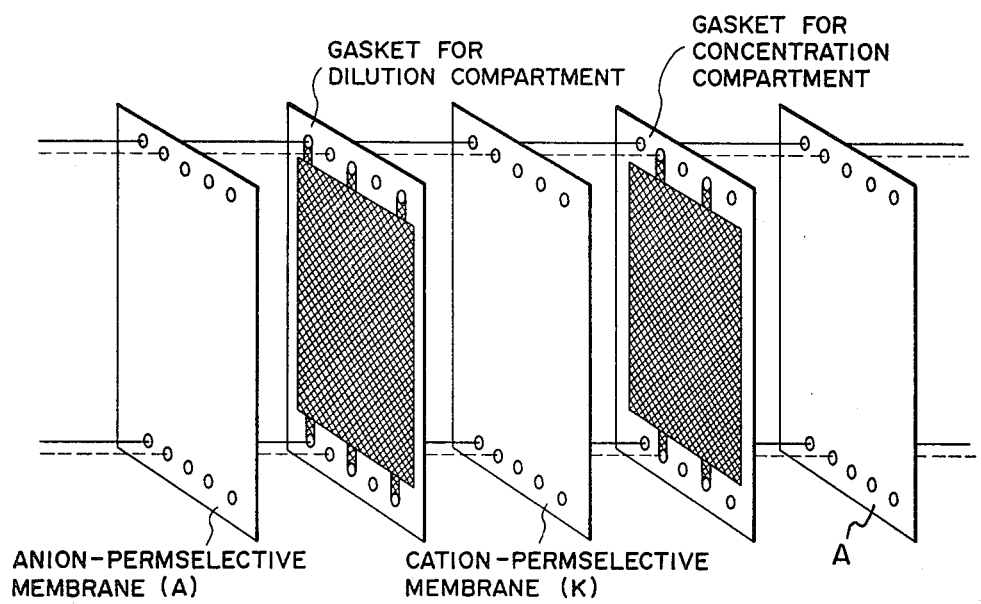
Figure 3:
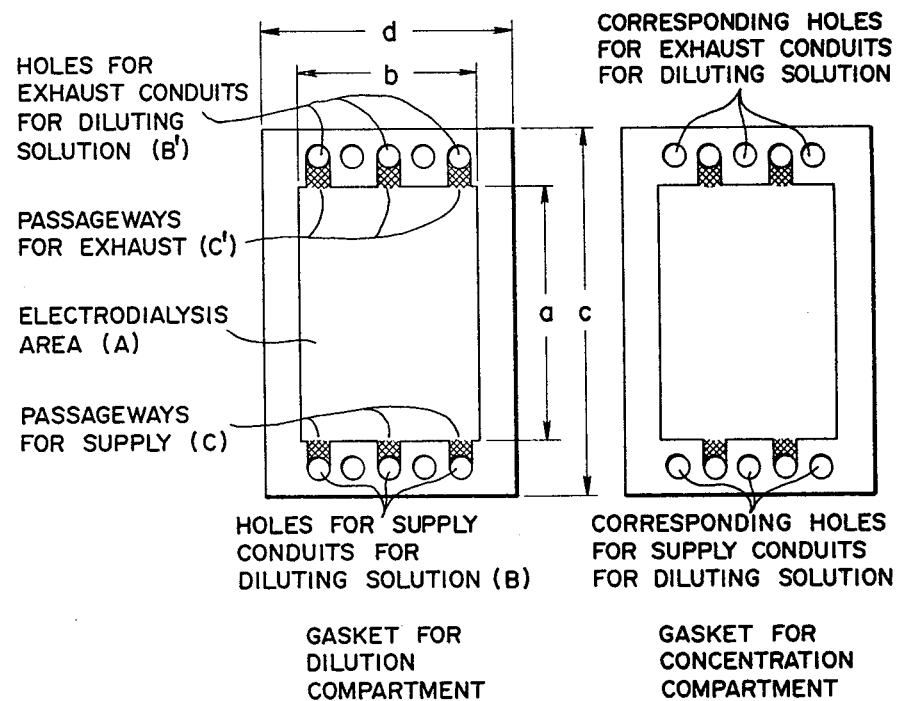
Figure 4:
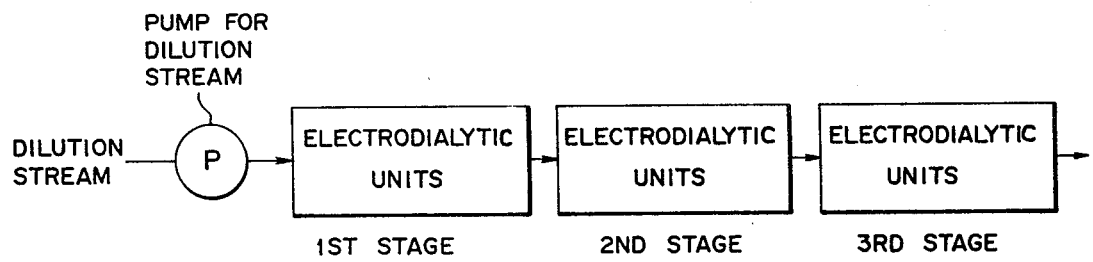
Figure 5A:
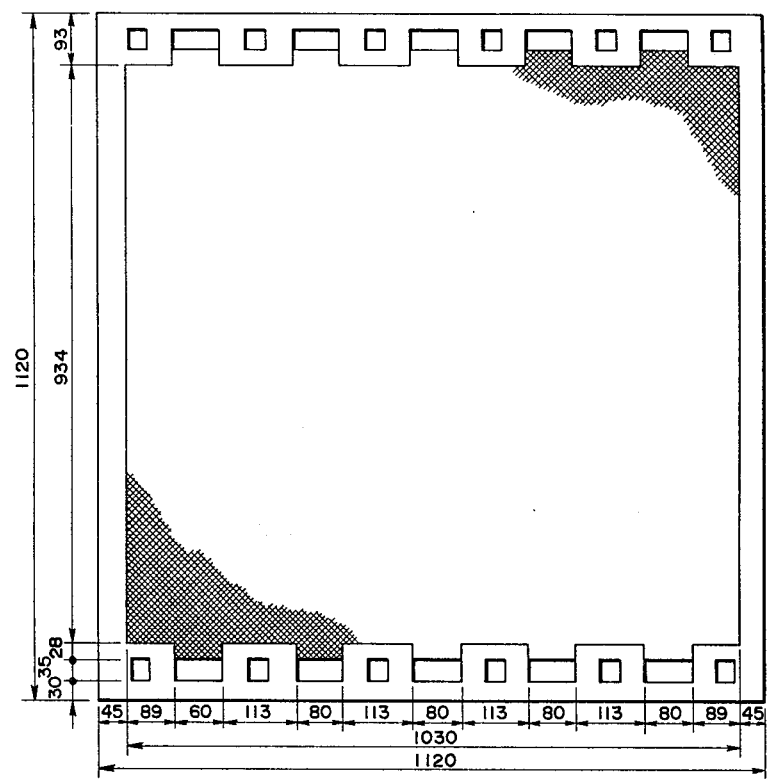
Figure 5B:
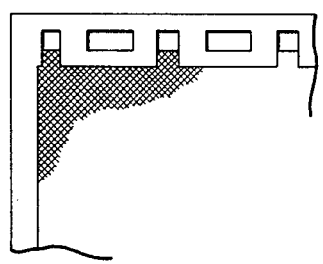
Figure 5A:
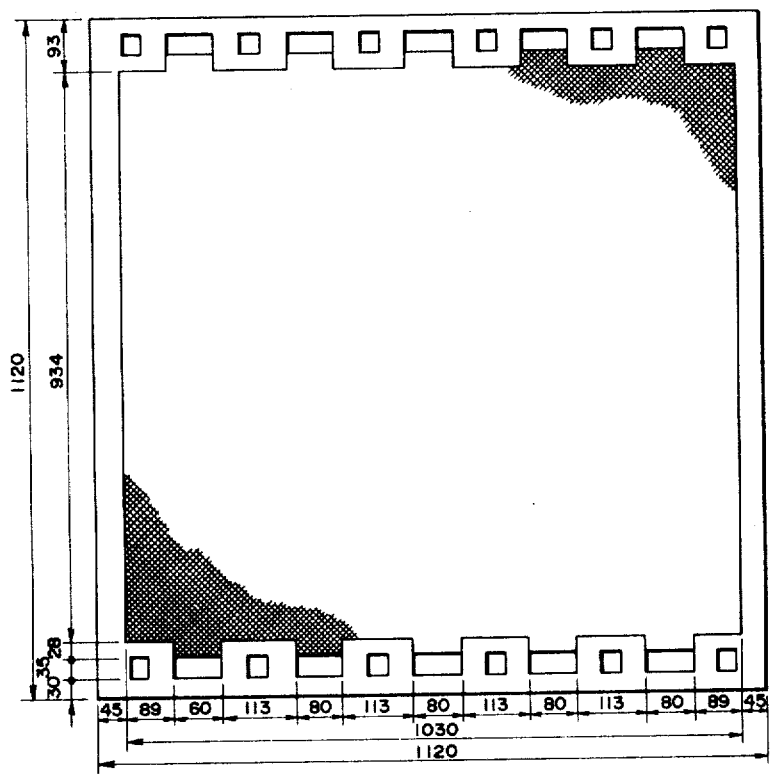
Figure 5B:
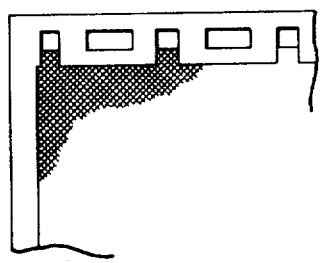

The present invention in the light of prior art may be better understood with reference to the accompanying drawings, in which;

FIG. 1 shows cross-sectional view of a stack;

FIG. 2 slant view of gaskets and ion-exchange membranes;

FIG. 3 plane views of a gasket for dilution chamber and a gasket for concentration chamber, respectively;

FIG. 4 typical flows of dilution streams in multi-stage series;

FIG. 5 plane views of one example of gasket with detailed dimensions, FIG. 5(a) showing gasket for dilution compartment and FIG. 5(b) only portion of holes for conduits and passageways of gasket for concentration compartment.

Referring to FIG. 1 and FIG. 2, a number of dilution compartments and concentration compartments are formed by providing ion-exchange membranes, sheet-flow type gaskets (having cutting for electrodialysis area and holes for internal conduits and passageways for supplying and exhausting solutions) and spacers of a net structure in the manner as shown in FIG. 2. At one or both ends of this assembly are provided fastening frames and frames for supplying and exhausting of solutions to form a group which is called as stack as shown in FIG. 1. A number of stacks are arranged between a pair of electrodes to provide an electrodialytic unit as shown in FIG. 1. A number of such a filter-press type electrodialytic units are arranged to carry out electrodialysis, as is widely practiced in the field of desalination or concentration.

In particular, in practicing desalination of sea water or brackish water on an industrial scale with product water in amount of 100 m$^3$/day or more, it is desirable, as frequently practiced, to assemble a multi-stage system by combining stacks into plural stages with different concentrations for dilution compartments and current densities, respectively. Namely, according to the multi-stage desalination process wherein desalination is effected to each predetermined concentration in each stage, desalination is carried out in multiple stages. As a result, in the ultimate stage, the salt concentration in the dilution stream can be made lower and therefore product water with a desired concentration can be obtained without recycle. Furthermore, in each stage, desalination can be performed at a current density corresponding to respective concentrations of the dilution streams to the advantages of greater desalination capacity and stable operation for a long time. If it is possible to flow dilution streams by means of one pump in multiple stages in series, as diagrammatically shown in FIG. 4, in practice of said multi-stage electrodialysis process, maintenance can be rendered very easy with lower running cost due to smaller number of pumps and further the construction cost of the plant can be made less expensive. In prior art, however, it has been impossible to flow dilution streams in multiple stages in series by such a one-pump unit (this operation is hereinafter referred to as "one pump multi-stage operation"). When one pump multi-stage operation is carried out according to conventional procedure, due to pressure drop through each stage, the pressure imposed on the stack in the first stage is necessarily large to increase leaking inside and outside of the stack and lower electrodialyzing performance. In an extreme case, gaskets may be ejected out of the stack, whereby electrodialysis is made impossible. Further, due to such problems which may possibly occur as lowering of limiting current density or increase of electric resistance of the stack caused by expansion of dilution compartment or unequal flow rate through each compartment, one pump multi-stage operation is rather disadvantageous. Further, according to this operation gases entrained in dilution system can hardly be discharged to increase the voltage of the stack or cause water dissociation, whereby stable operation is difficult.

The object of the present invention is to provide a novel multi-stage electrodialysis process according to one pump multi-stage operation in which the drawbacks of the prior art as mentioned above are overcome.

The present inventors have made extensive studies over the structure of the gasket and have invented a structure suitable for one pump multi-stage operation to have made possible one pump multi-stage operation on an industrial scale.

The present invention provides a process for desalination of sea water or brackish water by multi-stage electrodialysis by passing dilution streams by means of one pump unit in series through a multi-stage electrodialysis apparatus comprising two or more electrodialytic units assembled in series, each unit consisting of at least one stack arranged between a pair of electrodes, each stack having from 50 to 500 pairs of an anion exchange and a cation exchange membranes with areas of from 30 to 250 dm$^2$, respectively, arranged alternately and gaskets interspaced between the membranes to define alternately concentration and dilution compartments, wherein the improvement comprises using gaskets of a structure having the following dimentional parameters:

(a) $A/T = 0.6$ to $0.85$;

(b) $B/A$ and $B'/A = 0.006$ to $0.03$, respectively; and (c) $C/A$ and $C'/A = 0.008$ to $0.05$, respectively, wherein A represents electrodialysis area of each gasket, T total area of each gasket, B and B' total areas of holes in each gasket for supply conduits for diluting solution and for exhaust conduits for diluting solution, respectively, and C and C' total areas of passageways for supplying and exhausting diluting solution, respectively.

According to the process of the present invention, one pump multi-stage operation is made possible on an industrial scale without lowering the production performance and without suffering from the various problems as mentioned above of prior art.

In the present invention, the electrodialysis area (A) refers to the area of a gasket through which current is permitted to pass to perform electrodialysis. FIG. 3 shows schematic drawings of gaskets for dilution compartment and for concentration compartment, respectively. In this Figure, the electrodialysis area is equal to $a \times b$, with total area of $c \times d$. The holes (B and B') for supply conduits and exhaust conduits for diluting solution are holes provided in the gasket at marginal portions thereof for supplying and exhausting diluting solution, respectively. According to the embodiment of FIG. 3, these holes are provided in the same cuttings on the dilution compartment gasket in which passageways for supplying and exhausting diluting solution are also provided adjacent thereto. In such a case, the areas of the holes in the dilution compartment gasket are the same as those of corresponding holes on the concentration compartment gasket. The passageways (C and C') refers to the area of the cutting in the gasket which communicate the electrodialysis area with the holes as mentioned above. Usually, the numbers of the holes for supply conduits and for exhaust conduits are from 2 to 20, preferably from 3 to 15, respectively, preferably provided at regular intervals. The number of the holes for supply conduits is usually the same as that for exhaust conduits, but different numbers may also be used.

As mentioned above, it is critical in the present invention that the ratio A/T should be within the range from 0.6 to 0.85, preferably from 0.70 to 0.83, most preferably from 0.76 to 0.80. If the ratio A/T is less than 0.6, desalination performance of electrodialytic unit is unpractically too small. A ratio of A/T exceeding 0.85, is not suitable for the present process, since the area of hem of the gasket is made smaller and leak is liable to occur outside of the stack. Furthermore, a ratio of A/T exceeding 0.85 can be achieved by providing holes for supply conduits and for exhaust conduits for diluting solution at outside of each compartment. Such a structure, however, is complicated and makes assembling and disjointing of the stack difficult.

According to the present invention, the gasket to be used should have a structure which further satisfies the following correlations of area ratios:

(a) B/A (and B'/A)=0.006 to 0.03, preferably 0.008 to 0.02
(b) C/A (and C'/A)=0.008 to 0.05, preferably 0.01 to 0.03

When the ratio B/A (and B'/A) is smaller than 0.006, the pressure drop through supply and exhaust conduits is increased to impose too heavy a load on the pump and cause bad influences such as water dissociation. With a ratio of B/A (and B'/A) exceeding 0.03, leak or leak current may be made greater.

When the ratio C/A (and C'/A) is smaller than 0.008, uniform distribution of diluting solution to the electrodialysis area is made difficult and at the same time pressure drop is increased. With a ratio C/A (and C'/A) over 0.05, leak or leak current may be made greater to deteriorate electrodialyzing ability.

In the present invention, any of commercially available cation and anion exchange membranes can be used as ion-exchange membranes. In an operation on an industrial scale of desalination by electrodialysis in an amount of 100 m$^3$/day or more, the area of ion-exchange membrane is generally from 30 dm$^2$ to 250 dm$^2$, preferably from 50 dm$^2$ to 200 dm$^2$ and the number of pairs of membranes is from 50 to 500, preferably from 100 to 400. With an ion-exchange membrane having an area smaller than 30 dm$^2$, the amount of desalination per one pair of membrane is too small and therefore the desalination ability is too low. On the contrary, a membrane with an area larger than 250 dm$^2$ is not practical because handling of ion-exchange membranes at the time of assembling or disjointing is difficult. When the number of membrane pairs per one stack is less than 50, the number of stacks is increased to make assembling or disjointing works cumbersome and the number of frames and pipes for feeding and discharging of liquids is also increased to economical disadvantage. On the other hand, when the number of the pairs is increased to larger than 500, the weight as well as the volume of one stack is larger to make handling in assembling or disjointing of the electrodialytic cell unpractically difficult.

In particular, when passageways for diluting and concentrating solutions are provided only at the opposite sides on the electrodialysis area, the widths of the passageway openings for supplying and exhausting diluting solutions, respectively, should have certain ratios relative to the lengths of the sides of the electrodialysis area at which the respective openings are provided within the range specified below:

l/L and l'/L'=0.20 to 0.75, respectively
wherein l represents the sum of the widths for passageway openings for supplying diluting solution, l' that for exhausting diluting solution, L length of the side of the electrodialysis area at which the passageway openings supplying diluting solution are provided, and L' the length of the side of the electrodialysis area at which the passageway openings for exhausting diluting solution are provided.

When each opening ratio is below 0.20, uniformity of liquid flow through the compartment is lowered to increase pressure loss, which is not desirable in the present electrodialysis process. On the contrary, when it is over 0.75, leak is undesirably increased.

The gaskets to be used in the present invention may be usually from 0.3 to 2 mm in thickness and, be made of any of such materials as natural rubber, synthetic rubbers (e.g. styrene-butadiene rubber, chloroprene rubber, isoprene rubber, etc.), synthetic resins (e.g. polyethylene, polyvinyl chloride, ethylene-vinyl acetate copolymer, etc.) and the like. Among them, natural and synthetic rubbers and ethylene-vinyl acetate copolymer are preferred. There may also be used in the present invention spacers which are conventionally provided at the vacant space for electrodialysis area of the gasket for the purpose of prevention of mutual contact between the ion-exchange membranes and uniform distribution of liquids through electrodialyzing compartments. As such spacers, nets made of plastic materials having thickness similar to gasket may be available.

The passageways may be provided with inserts as conventionally practiced for prevention of leak between dilution and concentration streams. Any of inserts known in the art such as net spacer, compressible projection or non-compressible material may be available.

The areas of holes for supply and exhaust conduits and of passageways for concentrating solutions can be varied, respectively, depending on the manner in which concentrating solutions are flown, the composition of raw water, the flow velocity through concentrating compartment. But they are usually desired to be made similar to or smaller than the areas of holes for supply and exhaust conduits and passageways for diluting solutions, respectively.

In the present invention, one pump unit consists usually of one pump for supplying dilution streams. But alternatively, from standpoint of capacity of the pump or maintenance thereof, about two to five pumps may be used to make up one pump unit.

The process according to the present invention, wherein dilution streams are flown by means of one pump unit in series through multiple stages, is operable irrespective of whether each stage consists of one stack or a number of stacks. While the process is operable even when the number of stacks and membrane pairs is different between the stages, it is desirable for better efficiency to use the same number of stacks and membrane pairs for each stage.

The number of stages is preferably from 2 to 4. If desired, the one pump multi-stage operation of the present invention can be combined with any other desalination process.

The process of the present invention can be practiced with various industrial advantages. For example, the extent of desalination is greater and the desired product concentration can readily and favorably be obtained. Furthermore, due to smaller number of pump unit per one stage, maintenance is easy with smaller construction and running costs.

EXAMPLE 1

One hundred dilution compartment gaskets and one hundred concentration compartment gaskets as shown in FIG. 5(a) and (b), respectively, each being 0.75 mm in thickness and provided with net spacers at both electrodialysis area and passageway, and one hundred anion exchange membranes (Aciplex A-101, trade mark, Asahi Kasei Kogyo Kabushiki Kaisha, Japan) and one hundred cation exchange membranes (Aciplex K-101, trade mark, Asahi Kasei Kogyo Kabushiki Kaisha, Japan), each being provided with holes for supply and exhaust conduits, are assembled into a stack. Three of this stack comprising 100 pairs, each being provided at both ends of the stack with frames for supplying and exhausting solutions, and frames for electrodes are jointed by pressing by means of a hydraulic press.

The dilution streams were flown from the pump in series through each stage (each stack) as shown in FIG. 4 to perform three-stage series operation. A diluting sea water (chlorine ion conc., 0.030 N) was passed as raw water to be diluted at the rate of 25 m³/hour. The inlet pressure in the first stage was measured to be 5 m $H_2O$ (water column).

The areas and lengths of respective parts of the gasket used is shown in Table 1.

Table 1

| Area, length, area ratio, and length ratio | |
|---|---|
| T | 12,544 cm² |
| A | 9,620.2 cm² |
| B(B') | 140 cm² |
| C(C') | 112 cm² |
| l(l') | 40 cm |
| L(L') | 103 cm |
| A/T | 0.77 |
| B/A(B'/A) | 0.015 |
| C/A(C'/A) | 0.012 |
| l/L(l'/L') | 0.39 |

Then, electrodialysis was carried out using the multi-stage electrodialytic cells in which the above gaskets are arranged. Electrodialysis was carried out under the current conditions of 100 A for the first stage, 65 A for the second and 40 A for the third. The concentration of the product water (outlet concentration in the third stage) after current passage for 10 minutes in terms of chlorine concentration were 0.005 N. When this operation was continued for 24 hours, the product water concentration was the same as that after 10 minutes, whereby there was no elevation of stack voltage to enable very stable operation.

COMPARATIVE EXAMPLES

According to the same procedure as described in Example 1, various comparative tests were conducted by using gaskets having the dimensional parameters outside the scope of the present invention to give the results as shown in Table 2, in which the result of Example 1 is also set forth.

Table 2

| | Dimensional parameters | | | | Inlet | Conc. of Cl⁻ at the outlet of | Observation after 24 hours' continued |
|---|---|---|---|---|---|---|---|
| | A/l | B/A | C/A | l/L | pressure | the 3rd stage | running |
| Example 1 | 0.77 | 0.015 | 0.012 | 0.39 | 5 m $H_2O$ | 0.005 N | No change |
| Comparative example 1 | 0.854 | 0.010 | 0.010 | 0.39 | unmeasurable because frame of gasket in the 1st stage came out of the stack at the time of passing raw water | — | — |
| example 2 | 0.50 | 0.015 | 0.012 | 0.39 | 6 m $H_2O$ | 0.005 N | Stack voltage increased, pH of product water lowered, scale precipitated in some of concentration compartments in the 1st stage, by water dissociation |
| example 3 | 0.77 | 0.005 | 0.012 | 0.39 | 7 m $H_2O$ | 0.005 N | pH of product water slightly lowered, scale precipitated in some of concentration compartments in the 1st stage |
| example 4 | 0.77 | 0.035 | 0.015 | 0.62 | 4 m $H_2O$ | 0.009 N (conc. stream seemed to be leaked into dilution side) | — |
| example 5 | 0.77 | 0.015 | 0.004 | 0.22 | 7 m $H_2O$ | 0.005 N | No change |
| example 6 | 0.72 | 0.015 | 0.060 | 0.73 | 4 m $H_2O$ | 0.013 N (conc. streams seemed to be leaked into | — |

What we claim is:

1. In a process for desalination of sea water or brackish water by multi-stage electrodialysis by passing dilution streams by means of one pump unit in series through a multi-stage sheet flow type electrodialysis apparatus comprising two or more electrodialytic units assembled in series, each unit consisting of at least one stack arranged between a pair of electrodes, each stack having from 50 to 500 pairs, each pair consisting of an anion exchange and a cation exchange membrane, each membrane having an area of from 30 to 250 dm$^2$, respectively arranged alternately, and gaskets interspaced between the membranes to define alternately concentration and dilution compartments, the improvement which comprises using gaskets of a structure having the following dimensional parameters:

(a) A/T=0.6 to 0.85;
(b) B/A and B'/A=0.006 to 0.03, respectively; and
(c) C/A and C'/A=0.008 to 0.05, respectively, wherein A represents the electrodialysis area of each gasket, T the total area of each gasket, B and B' the total areas of holes in each gasket for supply conduits for diluting solution and for exhaust conduits for diluting solution, respectively, and C and C' the total areas of passageways for supplying and exhausting diluting solution, respectively.

2. A process as in claim 1, wherein the electrodialysis apparatus consists of two stages.

3. A process as in claim 1, wherein the electrodialysis apparatus consists of three stages.

4. A process as in claim 1, wherein the electrodialysis apparatus consists of four stages.

* * * * *

UNITED STATES PATENT AND TRADEMARK OFFICE
CERTIFICATE OF CORRECTION

PATENT NO. : 4,172,779
DATED : October 30, 1979
INVENTOR(S) : Akira Yamaguchi, et al It is certified that error appears in the above—identified patent and that said Letters Patent is hereby corrected as shown below:

Sheet 3 of the drawings should be inserted as per attachment.

THIS CERTIFICATE OF CORRECTION APPLYS TO THE GRANT EXCLUSIVELY.

Signed and Sealed this

Eighth Day of July 1980

[SEAL]

*Attest:*

SIDNEY A. DIAMOND

*Attesting Officer*  *Commissioner of Patents and Trademarks*